US009183875B2

(12) United States Patent (10) Patent No.: US 9,183,875 B2
Ries et al. (45) Date of Patent: Nov. 10, 2015

(54) MODULE SELF-DISCOVERY IN A STORAGE LIBRARY

(75) Inventors: James Lee Ries, Erie, CO (US); Terry Lynn Lane, Westminster, CO (US); Timothy Craig Ostwald, Boulder, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 577 days.

(21) Appl. No.: 13/528,489

(22) Filed: Jun. 20, 2012

(65) Prior Publication Data

US 2013/0346687 A1 Dec. 26, 2013

(51) Int. Cl.
*G06F 12/00* (2006.01)
*G11B 15/68* (2006.01)
*G06F 3/06* (2006.01)

(52) U.S. Cl.
CPC ............ *G11B 15/689* (2013.01); *G06F 3/0607* (2013.01); *G06F 3/0632* (2013.01); *G06F 3/0686* (2013.01)

(58) Field of Classification Search
CPC .... G06F 3/0689; G06F 3/0607; G06F 3/0686
See application file for complete search history.

(56) References Cited

U.S. PATENT DOCUMENTS 7,474,781 B2 * 1/2009 Chamberlain ................ 382/153
2008/0082699 A1 * 4/2008 Alrod et al. ....................... 710/2

* cited by examiner

*Primary Examiner* — Cheng-Yuan Tseng
*Assistant Examiner* — Alan Otto
(74) *Attorney, Agent, or Firm* — Marsh Fischmann & Breyfogle LLP; Daniel J. Sherwinter; Kevin J. Duffy

(57) ABSTRACT

Embodiments include systems and methods for detecting logical presence and location of modules, detecting physical presence and location of modules, and mapping the logical and physical locations together for use by the storage library. For example, when an expansion module is installed, it is connected to a network and it reports its logical presence and logical network location to a base controller in the base module. A robotic mechanism is used to trigger one or more presence sensors to detect physical presence and location of the installed expansion module. The base controller or another component generates and stores a mapping between the logical location and the physical location. The storage library can use the mapping to translate between logical and physical functionality.

20 Claims, 8 Drawing Sheets

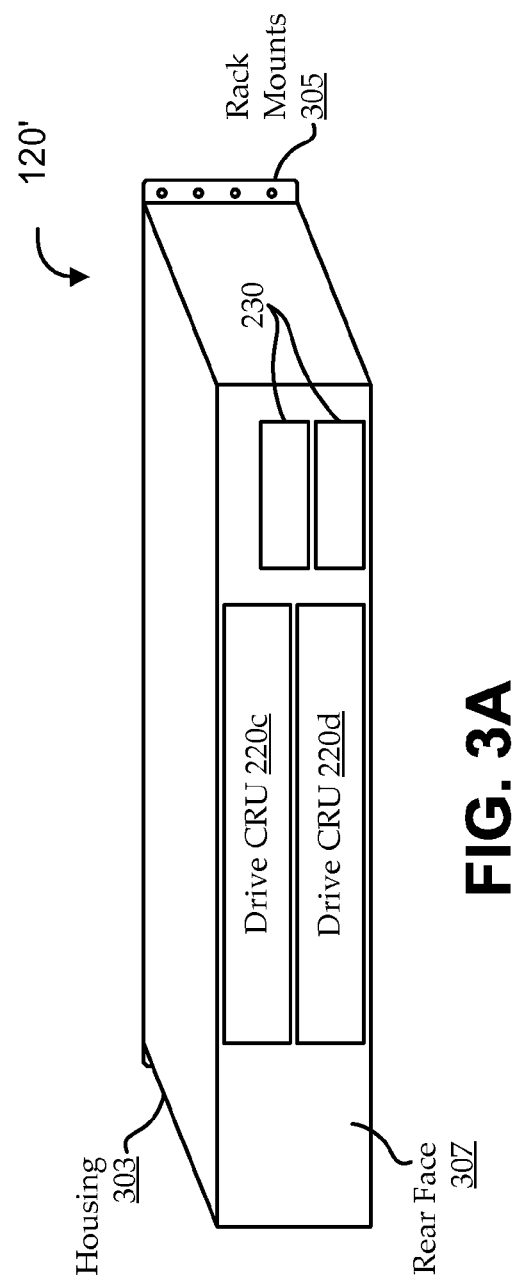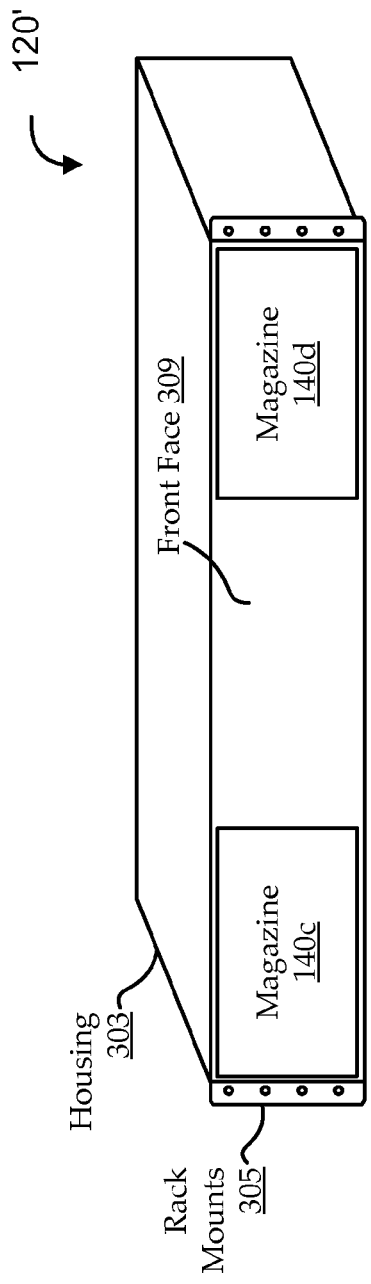
FIG. 3A
FIG. 3B

US 9,183,875 B2

MODULE SELF-DISCOVERY IN A STORAGE LIBRARY

FIELD

Embodiments relate generally to data storage systems, and, more particularly, to discovery of modules in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

In some storage libraries, cartridge magazines and/or drives are arranged in structural modules, and some storage libraries allow the modules to be added, removed, and/or rearranged. Proper functioning of the library may involve discovering which modules are present and in which locations. For example, the electromechanical systems of the storage library may interface physical devices in physical locations, while the logic and data processing systems of the storage library may interface with logical components at logical locations. Accordingly, it may be desirable for the storage library to be aware of which logical functions are available at which physical locations.

BRIEF SUMMARY

Among other things, embodiments provide novel systems and methods for detecting logical presence and location of modules, detecting physical presence and location of modules, and mapping the logical and physical locations together for use by the storage library. For example, when an expansion module is installed, it is connected to a network and it reports its logical presence and logical network location to a base controller in the base module. A robotic mechanism is used to trigger one or more presence sensors to detect physical presence and location of the installed expansion module. The base controller or another component generates and stores a mapping between the logical location and the physical location. The storage library can use the mapping to translate between logical and physical functionality.

According to one set of embodiments, a data storage system is provided. The data storage system includes: a structural framework that defines a number of module installation locations for receiving a number of modules; a data network operable to facilitate communications between modules installed at the number of module installation locations via respective network interfaces; a robotic mechanism operable to traverse at least the number of module installation locations; and a processor. The processor is operable to: detect logical presence of each of a set of installed modules at respective logical locations in the data network, each installed module being communicatively coupled with the data network via a respective network interface and each respective logical location being associated with the respective network interface; direct the robotic mechanism to locate each of the set of installed modules, thereby detecting a physical presence of each installed module at a respective physical location in the data storage library; and generate mappings for each installed module between its respective logical location and its respective physical location. The data storage system further includes a data store operable to store the mappings.

According to another set of embodiments, a method is provided. The method includes: detecting, at a first module, a logical presence of a second module at a logical location in a data network; detecting, using a robotic mechanism, a physical presence of the second module at a physical location in the data storage library; communicating the physical location of the second module to the first module; and generating a mapping between the logical location of the second module and the physical location of the second module.

According to yet another set of embodiments, a controller is provided that is communicatively coupled with a data network and a robotic mechanism of a data storage system. The controller has a processor and a tangible, non-transient storage medium, and the storage medium has instructions stored thereon, which, when executed, cause the processor to perform steps. The steps include: detecting a logical presence of a module installed in the data storage system at a logical location in the data network; directing the robotic mechanism to locate the module, thereby detecting a physical presence of the module at a physical location in the data storage system; and generating a mapping between the logical location and the physical location of the module.

BRIEF DESCRIPTION OF THE DRAWINGS

The present disclosure is described in conjunction with the appended figures:

FIGS. 3A and 3B show rear and front views, respectively, of an illustrative expansion module, according to various embodiments;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
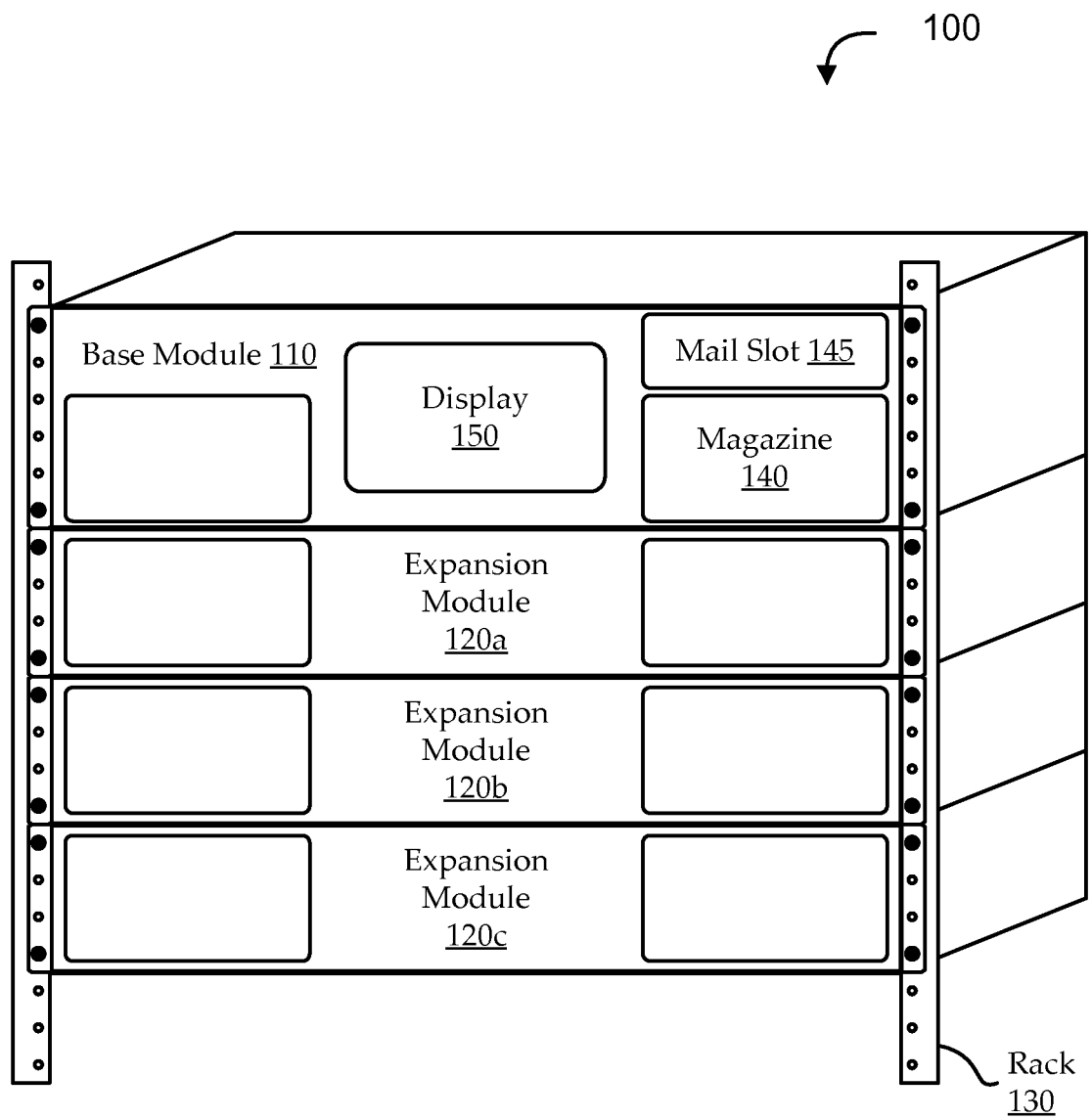
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

Figure 2A:
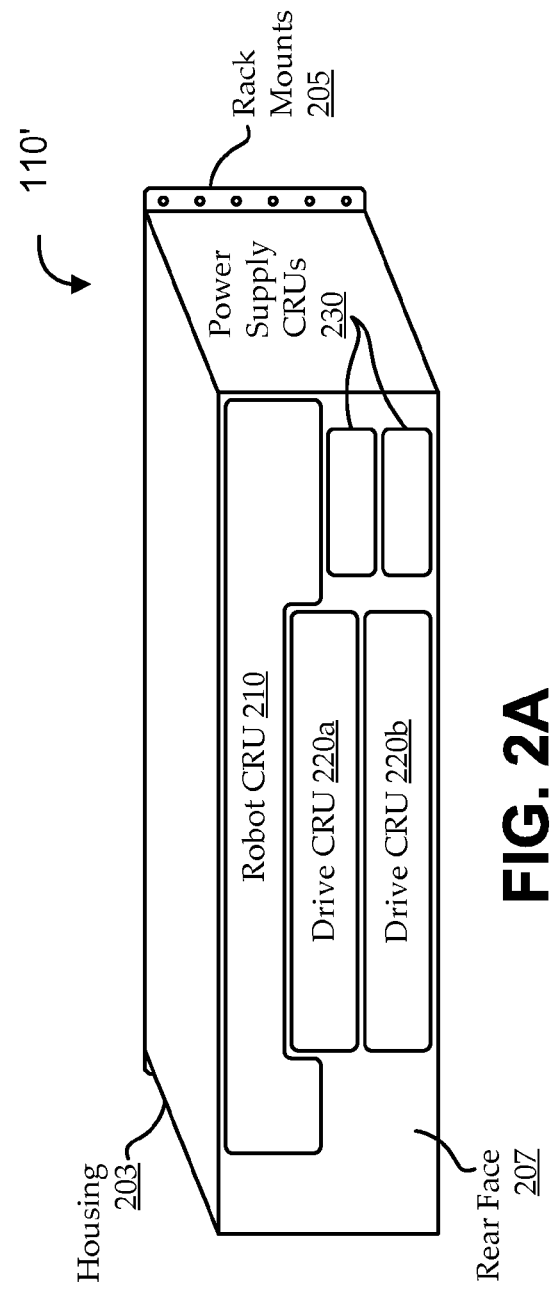
FIGS. 2A and 2B show rear and front views, respectively, of an illustrative base module, according to various embodiments.
Figure 2B:
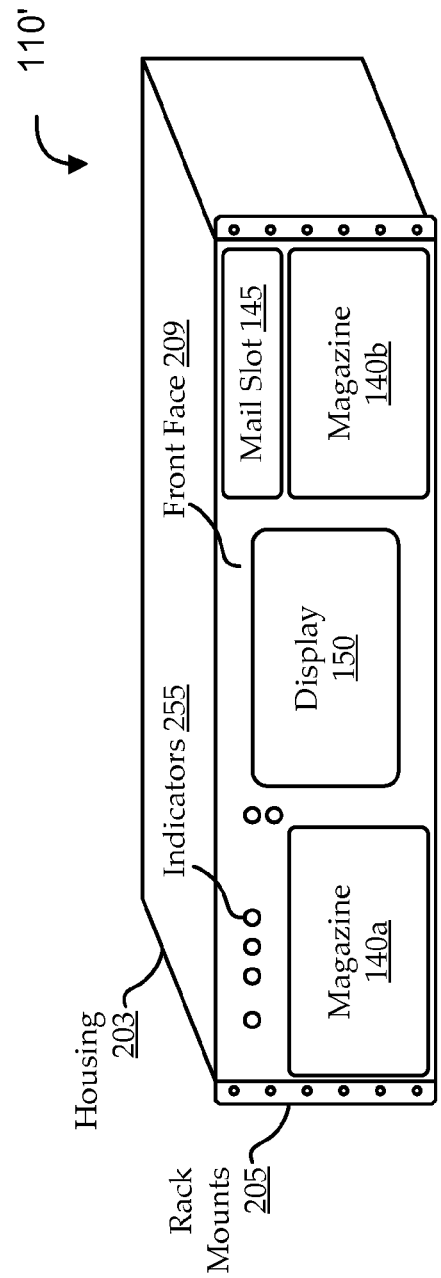

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only be inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touchscreen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user requests that the library opens the mailslot 145, giving the user access to a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to partially remove the mailslot 145 (e.g., to slide the mailslot 145 partially out of the base module 110 only when the robotic mechanism is in an appropriate condition (e.g., parked in the robot CRU 210). Certain embodiments having data partitions (as discussed above) only allow one partition at a time to make use of the mailslot 145.

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

Figure 4:
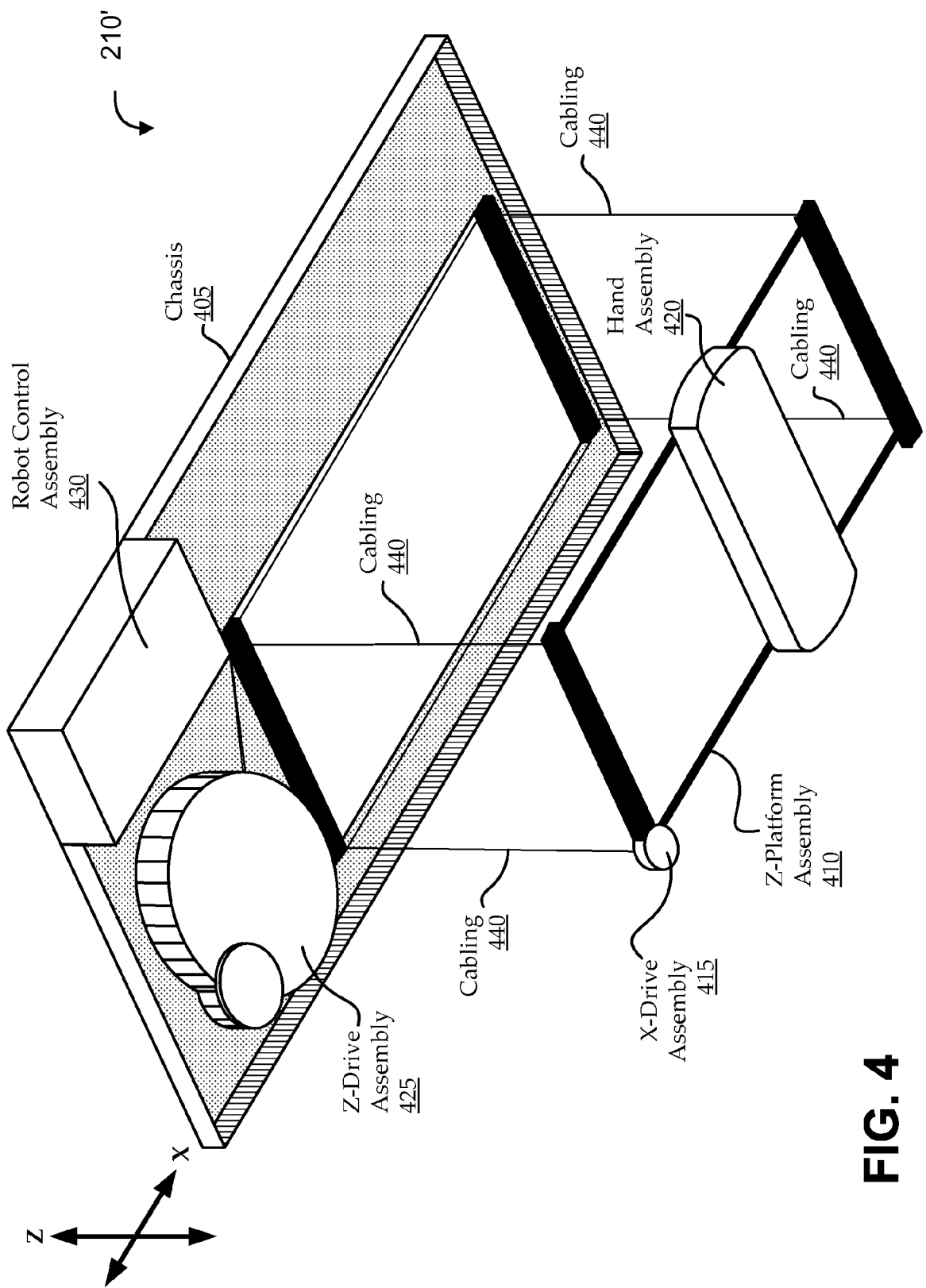
FIG. 4 shows a view is shown looking up at the underside of an illustrative robot CRU, according to various embodiments.

Turning to FIG. 4, a view is shown looking up at the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410 (shown partially lowered), an X-drive assembly 415, a hand assembly 420, a Z-drive assembly 425, and a robot control assembly 430. The term "robotic mechanism" is used generally herein to describe the components performing robotic functions. For example, the Z-platform assembly 410, X-drive assembly 415, and hand assembly 420 are suspended together as a robotic mechanism.

In the implementation shown, the robotic mechanism is configured to move from its "home" position in the robot CRU 210' of the base module 110' down and/or over to any magazine 145 slot or drive in the base module 110 or an expansion module 120. To accomplish this type of motion, the hand assembly 420 of the robotic mechanism moves in at least a "Z" direction (e.g., the +Z-direction is up towards the home position in the robot CRU 210, and the −Z-direction is down towards the bottom-most magazine slots of the bottom-most expansion module 120) and an "X" direction (e.g., the +X direction is towards the front side of the base module 110 or expansion modules 120, and the −X direction is towards the rear side of the base module 110 or expansion modules 120).

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (not shown) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge).

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

As discussed above, the base module 110 and expansion modules 120 include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Embodiments allow expansion modules 120 to be added, removed, and/or rearranged. Proper functioning of the library may involve discovering which modules are present and in which locations. For example, the electromechanical systems of the storage library may interface physical devices in physical locations, while the logic and data processing systems of the storage library may interface with logical components at logical locations. Accordingly, it may be desirable for the storage library to be aware of which logical functions are available at which physical locations.

One traditional approach for determining which modules are present is to hardwire the logical connections to physical locations. For example, a wired connection is present between a central processor (e.g., in the base module 110) and a particular physical component location, like a drive bay. Logical communications with the drive bay are always sent over that same wired connection to that same physical location. Accordingly, the logical and physical locations are physically tied together. Another traditional approach is to label a module with a barcode or the like. A vision system (e.g., a barcode reader on a robotic mechanism) can discover which modules are present by reading the labels.

Embodiments described herein detect logical presence and location of modules, detect physical presence and location of modules, and map the logical and physical locations together for use by the storage library. In some embodiments, when an expansion module 120 is installed, it is connected to a network (e.g., a universal serial bus (USB) interface, an Ethernet port, etc.) causing it to report its logical presence and logical network location (e.g., bus port or network address) to a base controller in the base module 110. A robotic mechanism is used to trigger one or more presence sensors to detect physical presence and location of the expansion module 120. The base controller (or another component) generates and stores a mapping between the logical location and the physical location. The mapping can be used by the storage library to translate between logical and physical functionality.

Figure 5:
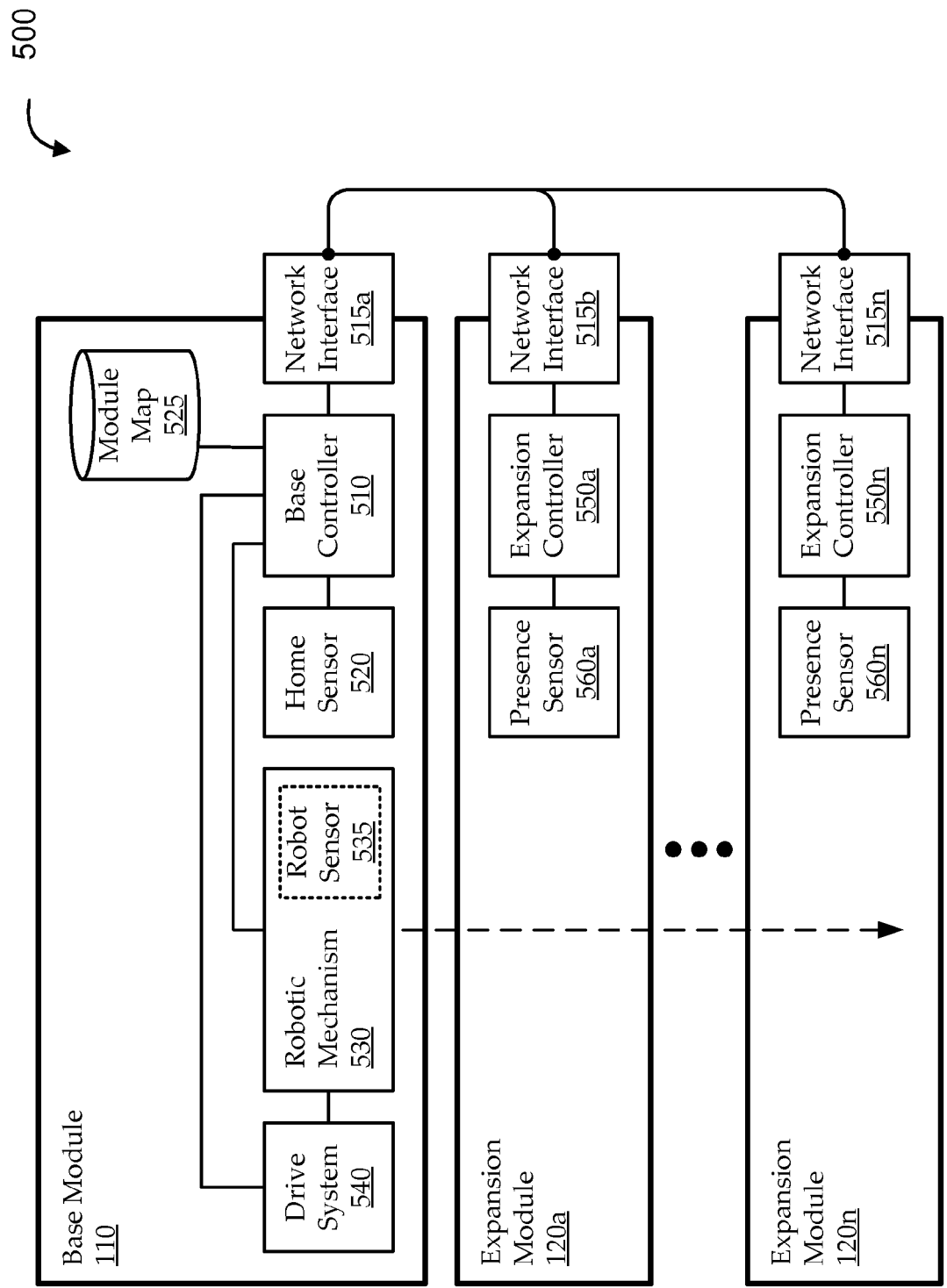
FIG. 5 shows a simplified functional block diagram of an illustrative data storage system, according to various embodiments.

FIG. 5 shows a simplified functional block diagram of an illustrative data storage system 500, according to various embodiments. The data storage system 500 includes a base module 110 and multiple expansion modules 120. As described above, the modules are configured to hold magazines with data cartridges and to support a robotic mechanism 530. For example, each expansion module 120 can hold one or more magazines, and each magazine can hold multiple data cartridges. Functionality of the data storage system 500 involves locating a particular data cartridge and moving the data cartridge between one or more magazine slot locations and one or more cartridge drives. To this end, the robotic mechanism 530 is operable to pick, place, and ferry cartridges throughout the data storage system. Embodiments of the base module 110 also include a drive system 540 for physically manipulating the robotic mechanism 530. For example, as described above in FIG. 4, the robotic mechanism 530 may include a Z-platform assembly 410 and a hand assembly 420 suspended from cabling 440. The position and/or orientation of the Z platform assembly 410 and/or the hand assembly 420 can be controlled by an X-drive assembly 415, a Z-drive assembly 425, a wrist mechanism, and/or other components generally referred to as part of the drive system 540.

The data storage system 500 operates in both a logical framework and a physical framework. According to the logical framework, a user may desire to interact with (e.g., read or write) data of a particular data cartridge via cartridge drive and logical communications with the cartridge drive. Facilitating this logical functionality may also involve the physical framework, for example, by involving movement of a physical data cartridge from one physical location (e.g., a magazine slot location) to another physical location (e.g., a cartridge drive). When an expansion module 120 is added to the data storage system 500, proper functioning of the data storage system 500 with respect to the added expansion module 120 may involve reliably adding the expansion module 120 to both the physical and logical frameworks of the data storage system 500. In particular, proper functioning may involve reliable detection of a physical presence of the expansion module 120 at a physical location in the data storage system 500 and a logical presence of the expansion module 120 at a logical location (e.g., a bus location, logical port, etc.) in the data storage system 500.

As illustrated, the base module 110 includes a base controller 510, a network interface 515a, a home sensor 520, a drive system 540, and a module map 525. The base controller 510 can be any suitable controller, including, for example, a microprocessor, a peripheral interface controller (PIC), or the like. In some embodiments, the base controller 510 acts as the central processor for the data storage system 500. Embodiments of the expansion modules 120 may each include an expansion controller 550. In some implementations, the expansion controllers 550 are similar or identical to the base controller 510. In other implementations, the expansion controllers 550 have appreciably less capability (e.g., a relatively small amount of processing power) in comparison to that of the base controller 510. For example, the base controller 510 may control the vast majority of the functions of the data storage system 500 (e.g., functions of the robotic mechanism 530, data processing functions, communications functions, user interaction functions, etc.), while each expansion controller 550 only controls certain functionality of its respective expansion module 120.

The base controller 510 may include or may be in communication with a data network (not shown). The data network may be any suitable type of wired or wireless, deterministic or nondeterministic network. In some embodiments, the data network is a universal serial bus (USB) network. Each expansion module 120 may include a network interface 515. In some embodiments, the base module 110 also includes a network interface 515a. The network interfaces 515 may be USB ports or other suitable logical or physical USB interfaces. In some implementations, the USB network is nondeterministic, so that any modules interfacing with the network bus are dynamically assigned a logical location (e.g., a port number) when the data storage system 500 is powered up. For example, each time the data storage system 515 is turned on, the data network newly assigns a unique logical location to each module. In other embodiments, the data network is an ethernet, Wi-Fi, Bluetooth, or other type of network.

As discussed above, certain functionality of the data storage system 500 involves a logical framework. Because expansion modules 120 can be added and removed from the data storage system 500, logical functionality may involve reliable detection of both a logical presence of each installed expansion module 120 and its respective logical location in the data network. In some implementations, when an expansion module 120 is installed, an interface is established between the expansion module 120 in the data network. For example, the expansion module 120 is plugged in to the data network via its network interface 515, or an automatic registration process is triggered upon installation. When the expansion module 120 joins the data network, the network may identify the module and its logical location in the data network. For example, the expansion module 120 may communicate a registration message via its network interface 515, and the registration message may include a module identifier. The message may be generated and communicated by the expansion controller 550 of the expansion module 122 the base controller 510 of the base module 110. From this message, the base controller 110 can determine that the expansion module 120 is logically present in the data network, and the base controller 110 can determine the logical location of the expansion module 120 in the data network.

While the above technique can be used to determine a logical presence and/or a logical location of an installed expansion module 120, the physical location of the expansion module 120 may not be known and/or its physical presence may not be confirmed. As discussed above, embodiments of the data storage system 500 are configured so that logical interfaces are not hardwired to particular physical locations. For example, in the case of a nondeterministic network, even if the network interfaces 515 are implemented as physical network ports, their respective logical locations would be dynamically assigned (i.e., the logical locations are not fixed to the physical network interfaces 515). In the case of a deterministic network, it may still be desirable to allow a particular expansion module 12 to be installed in any of a number of expansion module installation locations in the data storage system 500, so that any logical module identification may still end up corresponding to a different physical and/or logical location in the data storage system 500. Similar issues may arise with nonphysical network interfaces 515 (e.g. wireless interfaces), which may not physically connect to a bus or other network elements of the data storage system 500.

Accordingly, additional techniques are provided for determining a physical location and/or presence of an installed expansion module 120. Embodiments use the robotic mechanism 530 to detect features of the expansion modules 120, which can be used to determine the physical location of a particular expansion module 120 and/or to confirm physical presence of a particular expansion module. In some embodiments, a sensing component on the robotic mechanism 530 is configured to interface with another sensing component at a physical location of interest on the one or more modules. For example, each module may include a sensor, and the robotic mechanism 530 may include one or more coordinating features for interfacing (e.g., optically, physically, magnetically, etc.) with the sensor. Alternatively, the robotic mechanism 530 may include a sensor, and each module may include one or more coordinating features for interfacing with the sensor. The sensors may include one or more optical sensors, pressure sensors, magnetic sensors, or any other suitable type of sensor. The coordinating feature may include any feature for triggering the sensor. In one example, the sensor is an optical sensor and the coordinating feature is a geometric feature that interrupts the optical beam, a label that can be decoded by the optical sensor, etc. In another example, the sensor is a magnetic sensor and the coordinating feature is magnetic material (e.g., a permanent magnet, steel, etc.).

Embodiments of the base module 110 include a home sensor 520, which may be any of the types of sensors described above. When the robotic mechanism 530 is in a home position, the robotic mechanism 530 is configured to interface with the home sensor 520 (e.g., with a coordinating feature) to trigger detection by the base controller 510 of the robotic mechanism 530 in its home position. In alternative embodiments, the sensor is a robot sensor 535 implemented as part of the robotic mechanism 530. The base module 110 may then include one or more coordinating features configured to interface with the robot sensor 535 to trigger detection. Physical locations and/or presence of expansion modules 120 can be determined using similar techniques. In some embodiments, each expansion module 120 includes a presence sensor 560 (or, alternatively, a coordinating feature for interfacing with the robot sensor 535). When the robotic mechanism 530 is in a physical location corresponding to a module installation location, the robotic mechanism 530 is configured to interface with the presence sensor 560 of whichever expansion module 120 (if any) is in that module installation location. When the robotic mechanism 530 interfaces with a presence sensor 560 of an expansion module 120 in that module installation location, the physical presence of the detected expansion module 120 can be determined or verified. Further, the position of the robotic mechanism 530 can be determined (e.g., by decoding stepper motor information, accelerometer information, motor encoder signals, and/or other information from the drive system 540 or other sensors). The physical position of the detected expansion module 120 can then be determined according to the position of the robotic mechanism 530.

There are a number of techniques for physically locating and/or verifying an expansion module 120. According to one such technique, the data storage system 500 includes a number of module installation locations. The robotic mechanism 530 is configured to audit each module installation location (e.g., serially) to look for the newly installed expansion module 120. For example, as shown in FIG. 1, the data storage system 500 is designed to fit in a standard equipment rack, the base module 110 is three standard rack units ("RU") high, and each expansion module 120 is two RU high. Accordingly, some predetermined location (e.g., a presence sensor 560 location) in each properly installed expansion module 120 is two RU (e.g., 2×1.75=3.5 inches) above or below a respective location of its adjacent expansion module(s) 120. When an expansion module 120 is installed, its logical presence and location can be determined as described above, but its physical presence may not be known and/or confirmed. Embodiments direct the robotic mechanism 530 to move from its home position in the base module 110 to each of the module installation locations, for example, by lowering from the home position in 3.5-inch increments (e.g., or according to a predefined location map or other technique). At each module installation location, a determination is made as to whether the presence sensor 560 corresponding to the installed expansion module 120 is triggered by the robotic mechanism 530 being in that physical location. If not, the robotic mechanism 530 may proceed to a next module installation location. If so, the physical location of the robotic mechanism 530 can be used to determine the physical location of the expansion module 120 of interest.

Notably, when the robotic mechanism 530 reaches the physical location corresponding to the module installation location of a particular expansion module 120, the presence sensor 560 of that expansion module is triggered. Triggering of the presence sensor 560 can cause logical information to be communicated from the expansion controller 550 to the base controller 510. Because the originating logical location of the logical communication can be determined by the base controller 510 (e.g., a logical location may be included in the communication or otherwise determinable), the logical and physical locations can be correlated. For example, in some implementations, the robotic mechanism 530 moves to a first expected physical location corresponding to a module installation location. When there, the base controller 510 can query the presence sensor 560 of each connected logical entity until a match is found (e.g., until one is discovered to be triggered). The robotic mechanism 530 can then move to a next expected physical location corresponding to another module installation location. When there, the base controller 510 can query the presence sensor 560 of each (or each remaining) connected logical entity until another match is found. In this way, the library can iterate through all the physical and logical locations to discover all the expansion modules 120 and their corresponding physical and logical locations.

In some implementations, the robotic mechanism 530 checks each module installation location serially until the module of interest is physically located, at which point the robotic mechanism stops looking further. In other implementations, the robotic mechanism 530 continues to check some or all of the remaining module installation locations even after the module of interest is physically located. For example, it may be desirable to check whether a particular expansion module 120 is located at multiple physical locations, which may indicate an error. In some cases, checking all the module installation locations each time can simplify the implementation, can provide additional validation and/or auditing functionality, etc. In still other implementations, the robotic mechanism 530 is directed only to audit particular module installation locations. For example, the data storage system 500 may have previously acquired data indicating that the first three module installation locations include installed expansion modules 120. When a new module is detected, the robotic mechanism 530 can be directed to audit only the fourth module installation location, to audit only the first four module installation locations, to audit only module installation locations other than the first three, etc.

Another technique for physically locating and/or verifying an expansion module 120 involves sweeping the robotic mechanism 530 across a range of motion in a less discrete manner. For example, the data storage system 500 defines limits to the range of motion permitted to the robotic mechanism in at least certain dimensions. In the "Z" (e.g., vertical) dimension, the robotic mechanism 530 may be permitted to move from a home position (e.g., highest position) in the base module 110 to some opposite extent (e.g., lowest position) that may be defined by the expansion module 120 furthest from the base module 110. The robotic mechanism 530 is directed to move (e.g., sweep) over some or all of the range of motion defined by the extents while the data storage system 500 concurrently monitors for detection of the expansion module 120 of interest. For example, as the robotic mechanism 530 moves over a range of motion, one or more presence sensors 560 are monitored for a change in state indicating that the robotic mechanism 530 has interfaced with the sensor. The physical location of the robotic mechanism 530 can be used to determine the physical location of the expansion module 120 of interest. In various implementations, the robotic mechanism 530 can be directed to audit the entire range of motion between the extents, a portion of the range of motion corresponding to an expected physical location of the added expansion module 120, or any other suitable portion of the range of motion.

When the robotic mechanism 530 physically locates a module, multiple techniques are provided for determining which module has been physically located. The robotic mechanism 530 may trigger some presence sensor 560 at a particular physical location, but detection of physical presence of some module at a particular location may be insufficient to reliably determine which of a number of modules is physically present at that location. For example, when an expansion module 120 is installed in a module installation location (e.g., "Location 02") and is connected with the data network, it reports an identifier (e.g., "Module 5F") and is assigned a logical port number (e.g., "Port 04"). Some embodiments of the data storage system 500 are configured so that expansion modules 120 can only be installed and/or removed in a certain order. Accordingly, when Module 5F is logically detected, embodiments of the data storage system 500 can assume the module was installed in the next-available installation location, Location 02. The physical auditing techniques described above can then be used to validate this assumption. For example, if it is determined using the robotic mechanism 530 that an expansion module is physically present in Location 02, embodiments may assume that the physically detected module is Module 5F without further information.

In other embodiments, physical detection of a newly installed module can be further validated with additional information from the module itself. Using a similar example for the sake of clarity, when an expansion module 120 is installed in module installation location "Location 02," its expansion controller 550 establishes a connection with the data network during which it communicates its identifier as "Module 5F" and is assigned logical port number "Port 04." The presence sensor 560 of each expansion module 120 is in communication with its respective expansion controller 550. Accordingly, when the robotic mechanism 530 interfaces with the presence sensor 560 of each installed expansion module 120, the interfacing is detected by the respective expansion controller 550, which can communicate the detection to the base controller 510 along with that module's identifier. For example, when the robotic mechanism 530 moves to a physical location associated with Location 02, it interfaces with the presence sensor 560 of Module 5F, causing that module's expansion controller 550 to report the detection along with identifier "Module 5F" to the base controller 510. The base controller 510 is also aware (e.g., based on feedback from the drive system 540 or other components) of the physical location of the robotic mechanism 530 at the time the presence sensor 560 was triggered. In this way, the physical presence and location of Module 5F can be ascertained and validated.

The above description provides some illustrative techniques for detecting the logical presence and location of a newly installed module and some illustrative techniques for detecting the physical presence and location of a newly installed module. Also as described above, embodiments of the data storage system 500 operate in both logical and physical frameworks. Suppose a user directs the data storage system 500 to read data from a data cartridge located in "slot location 12" of "magazine 2" in "module 2" using the cartridge drive located in "drive bay 1" of "module 3." Embodiments of the data storage system 500 translate some or all of the user's physical-framework instructions to logical-framework commands. For example, certain functionality (e.g., facilitating data communications with the identified cartridge drive) may involve logically interfacing with the cartridge drive physically located in "drive bay 1" of "module 3," which may involve mapping that physical location to a corresponding logical location (e.g., at "port 06.1") in the data network.

Embodiments map the logical framework information (e.g., the logical presence and/or location information for the installed expansion modules 120) to the physical framework information (e.g., the physical presence and/or location information for the installed expansion modules 120). The mapping can be stored in any suitable type of data store. As illustrated, the data store is implemented as module map 525 in the base module 110.

Figure 6:
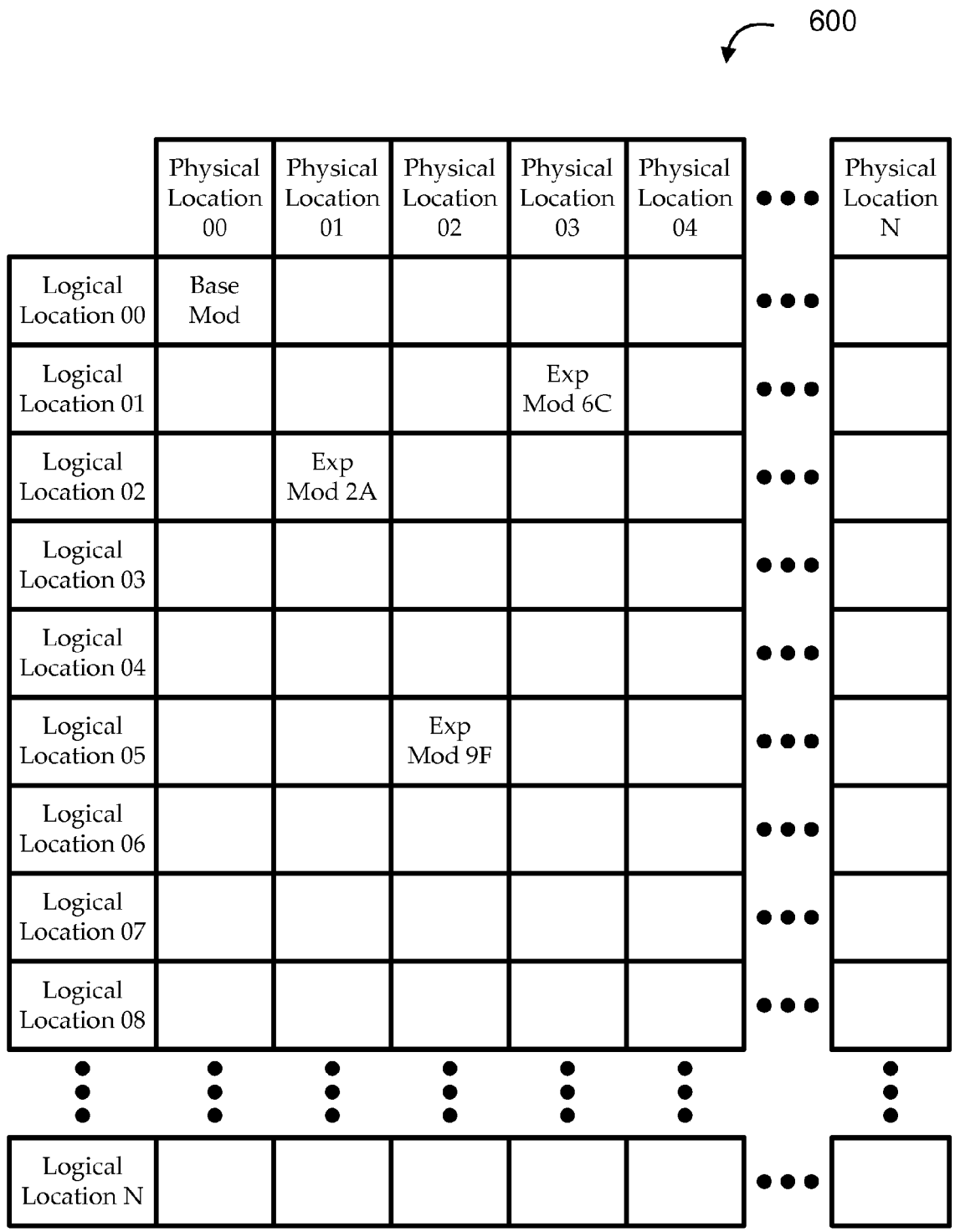
FIG. 6 shows an example of a mapping between physical and logical framework information for a data storage system, according to various embodiments.

For the sake of illustration, FIG. 6 shows an example of a mapping 600 between physical and logical framework information for a data storage system, according to various embodiments. The mapping 600 is represented as a two-dimensional array, though any suitable data format or arrangement can be used. Each row represents a possible logical location. For example, the data network is a bus having ports 0-N, represented by "Logical Location 00" through "Logical Location N," respectively. Each column represents a possible physical location. For example, the data storage system is installed in an equipment rack having module installation locations 0-N, represented by "Physical Location 00" through "Physical Location N," respectively.

In the illustrative scenario presented in FIG. 6, the data storage system includes a base module and three expansion modules. The base module is in Physical Location 00 and Logical Location 00. Certain embodiments always assign the base module a deterministic logical location, even if the rest of the data network is otherwise nondeterministic. Other embodiments assign all logical locations in a nondeterministic manner, so that the base module may not be at Logical Location 00. Expansion modules "2A," "9F," and "6C" are installed at "Physical Location 01," "Physical Location 02," and "Physical Location 03," respectively. Notably, expansion modules "2A," "9F," and "6C" have been non-sequentially assigned logical locations "Logical Location 02," "Logical Location 05," and "Logical Location 01," respectively. This may indicate that the logical locations are assigned non-deterministically, in which case, on each power-up of the system, the physical locations of the modules may stay the same and the logical locations may change. Alternatively or additionally, this may indicate that the network interfaces include a set of cables that can be plugged into any of the modules in any order, each having a deterministic or nondeterministic logical location assignment.

The logical and physical detection and mapping techniques described above effectively provide module self-discovery functionality. As expansion modules 120 are installed, removed, and/or rearranged in a data storage system, these techniques allow the data storage system to maintain a reliable inventory of which modules are installed in which physical locations, and how to communicate with those modules according to their respective logical locations. Accordingly, embodiments of the data storage system can automatically and dynamically maintain an updated physical framework, logical framework, and mapping between the two.

Figure 7:
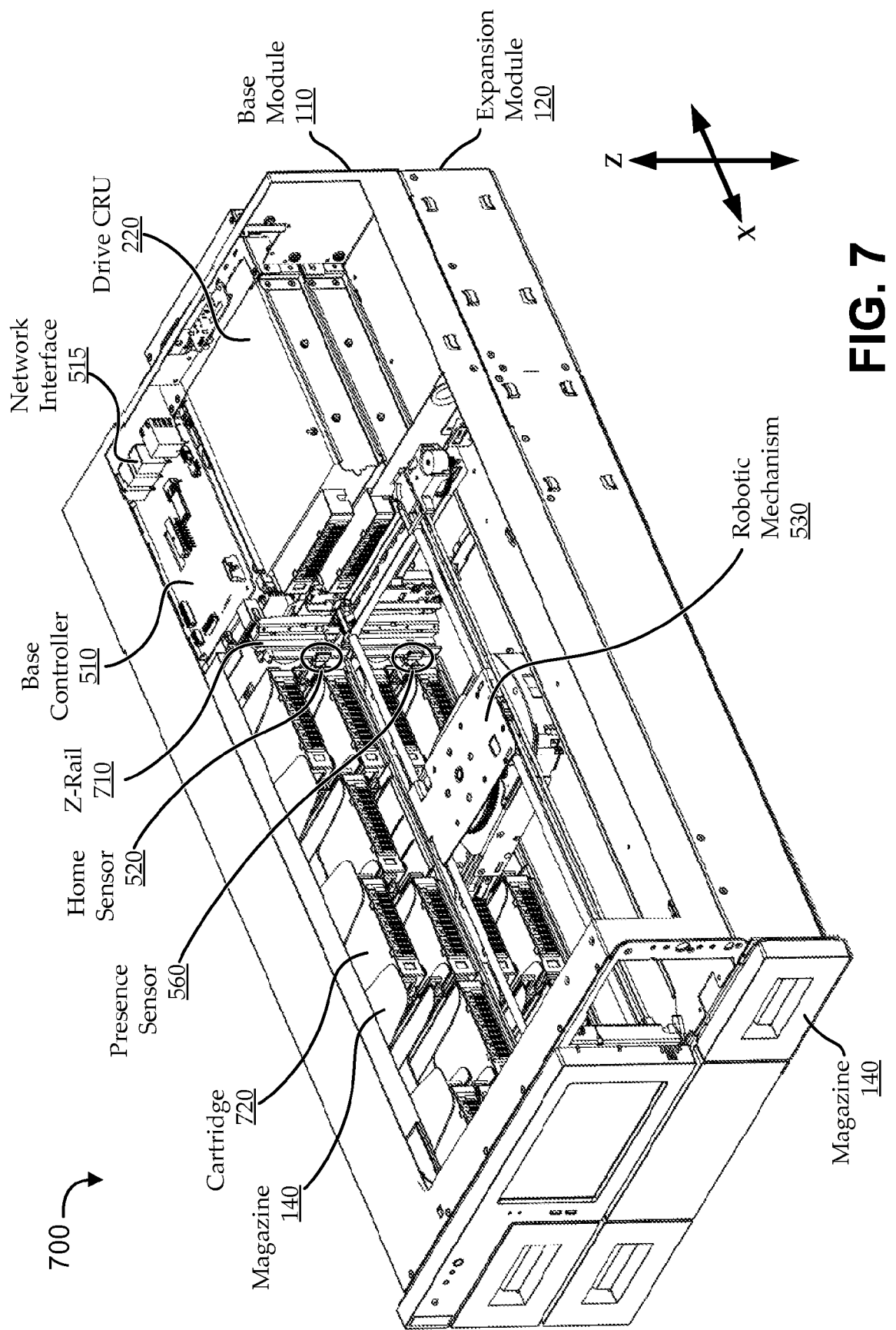
FIG. 7 shows an illustrative partial data storage system that includes various features described herein, according to various embodiments.

FIG. 7 shows an illustrative partial data storage system 700 that includes various features described herein, according to various embodiments. The data storage system 700 includes a base module 110 and one expansion module 120. The base module 110 has one magazine 140 installed that includes a number of data cartridges 720. The base module 110 may be the base module 110 illustrated in FIG. 2B with one of its magazines 140 and its mail slot 145 removed for clarity. The base module also includes a drive CRU 220 (i.e., a cartridge drive) for reading and/or writing data to the data cartridges 720 and a base controller 510 (e.g., processing circuitry and components, including a microprocessor, one or more network interfaces 515, power management components, etc.). The expansion module 120 is also shown with at least one magazine 140 installed that includes a number of data cartridges 720.

As illustrated, the data storage system includes a robotic mechanism 530 that can move between the modules to pick, place, and ferry the data cartridges 720. In some implementations, the robotic mechanism 530 moves in at least one dimension along one or more guides. In the implementation shown, the robotic mechanism 530 moves vertically between the base module 110 and the expansion module 120 along Z-rail 710. The base module 110 includes a home sensor 520, and the expansion module 120 includes a presence sensor 560. As described above, when the robotic mechanism 530 moves into a particular physical location, it interfaces with the home sensor 520 or the presence sensor 560, which can trigger detection of the robotic mechanism 530 in its home position or in a physical location corresponding to a module installation location, respectively.

The embodiment shown in FIG. 7 is intended only to be illustrative, and many modifications can be made without departing from the scope of the invention. For example, components may be positioned differently, different components may be used, additional or fewer components may be included, etc. The various system embodiments described above can be used to perform a number of functions, including embodiments of the novel functions described herein and further described according to the below methods. Further, the methods described below can be performed on systems other than those described above.

Figure 8:
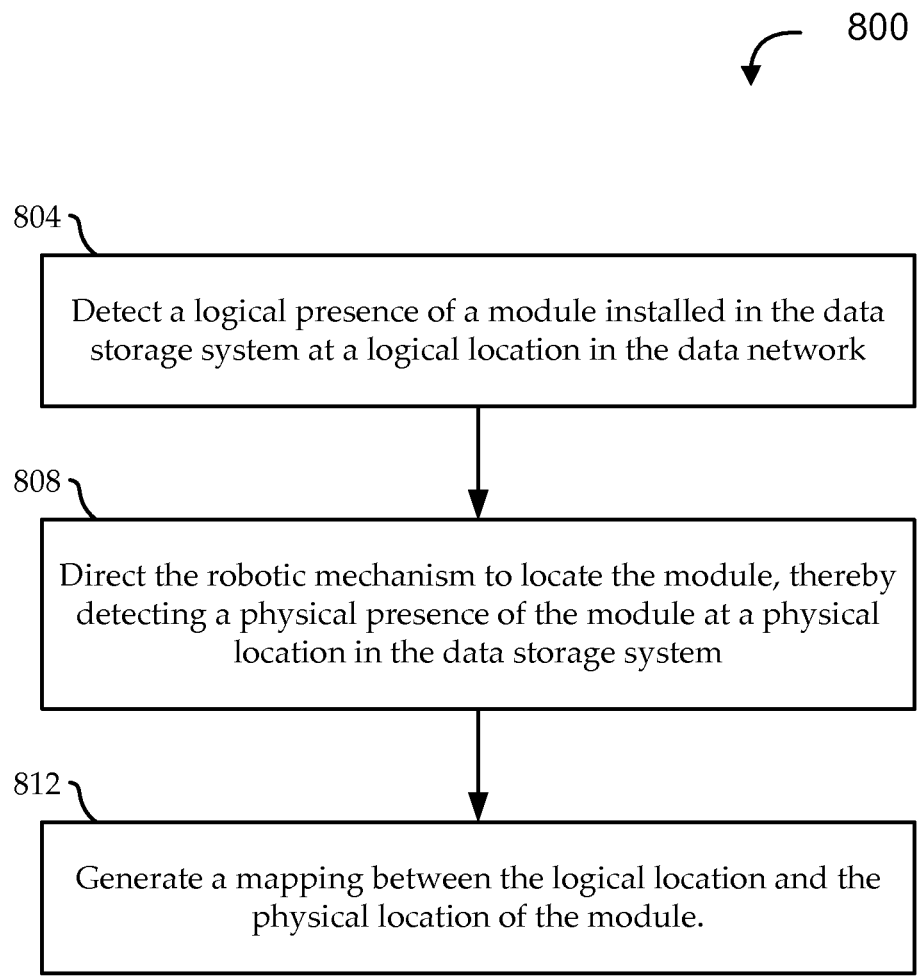
FIG. 8 shows a flow diagram is provided of an illustrative method for implementing module self-discovery, according to various embodiments.

Turning to FIG. 8, a flow diagram is provided of an illustrative method 800 for implementing module self-discovery, according to various embodiments. In some implementations, the method 800 is performed by a controller (e.g., base controller 510 of FIG. 5) communicatively coupled with a data network and a robotic mechanism of a data storage system. The controller can have a processor and a tangible, non-transient storage medium (e.g., memory) having instructions stored thereon for performing the stages of the method 800. Embodiments of the method 800 begin at stage 804 by detecting a logical presence of a module installed in the data storage system at a logical location in the data network. For example, when an expansion module is added to the data storage system, the module automatically registers with the data network. This can include communicating an identifier and/or being assigned a logical network location. In some embodiments, a first module (e.g., a base module) detects logical presence of a second module (e.g., an expansion module) at the logical location in the data network.

At stage 808, the robotic mechanism is directed to locate the module, thereby detecting a physical presence of the module at a physical location in the data storage system. For example, the robotic mechanism detects the installed expansion module at a module installation location of the data storage system. In some implementations, the robotic mechanism 530 and each module include sensing components (e.g., sensors and/or features configured to coordinate with the sensors) that interface when the robotic mechanism 530 is in a particular physical location to trigger physical detection of an installed module. According to some embodiments, when the module is physically detected at stage 808, the physical location of the module is recorded by or communicated to a base controller or some other processing component.

Physical detection can be performed in various ways. According to one embodiment, the data storage library includes a number of module installation locations, each defining a purported physical location at which a sensing component will be located when a module is properly installed at the respective module installation location. Detecting the physical presence and/or location of the module includes moving the robotic mechanism serially to each of the purported physical locations until the second module is detected to be physically present at a particular one of the purported physical locations. The particular purported physical location can then be reported as the physical location of the second module (e.g., the physical location of the second module can be determined according to the purported physical location). According to another embodiment, the data storage library defines a range of motion (e.g., extents) over which the robotic mechanism is permitted to move that at least encompasses a number of module installation locations. Detecting the physical presence and/or location of the module includes sweeping the robotic mechanism across at least a portion of the range of motion while monitoring for detection of a sensing component corresponding to the module. When the sensing component is detected, the robotic mechanism's location can be determined, and the physical location of the module can be determined, accordingly.

At stage 812, a mapping between the logical location and the physical location of the module is generated. For each installed module, the mapping can include the module's physical location in association with its logical location. In some implementations, the mapping also includes a module identifier separate from the physical and logical locations. For example, when a user command is received in a physical framework, the data storage system can use the mapping to translate the physical framework to an associated logical framework for carrying out any logical portions of the user's commands.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A data storage system comprising:
    a structural framework that defines a plurality of module installation locations for receiving a plurality of modules, each of the plurality of modules including a module identifier;
    a data network operable to facilitate communications between modules installed at the plurality of module installation locations via respective network interfaces;
    a robotic mechanism operable to traverse at least the plurality of module installation locations;
    a processor, operable to:
        detect logical presence of each of a set of installed modules at respective logical locations in the data network by associating respective logical location with the respective module identifier of the installed module, each installed module being communicatively coupled with the data network via a respective network interface and each respective logical location being associated with the respective network interface;
        direct the robotic mechanism to physically visit a plurality of locations, thereby detecting a physical presence of an installed module at a respective physical location in the data storage library such that in response to detecting the physical presence of the installed module, the robotic mechanism associates the respective physical location with the respective module identifier of the installed module independent of the detected logical presence of the installed module, the respective physical location corresponding to a respective module installation location of the installed module, each of the respective module installation locations in the data storage library associaitable with any of the respective logical locations detected in the data network; and
        generate mappings for each installed module between its respective logical location and its respective physical location based on the respective module identifier associated with its respective logical location and its respective physical location; and
    a data store operable to store the mappings.

2. The data storage system of claim 1, wherein the data network is a non-deterministic network, such that each network interface location is dynamically assigned a logical location when the data network is powered up.

3. The data storage system of claim 1, wherein:
    the data network comprises a universal serial bus (USB);
    each network interface is a USB interface; and
    the processor is operable to detect the logical presence of each installed module at the respective logical location by receiving a communication from the installed module over the USB via its USB interface indicating the logical location of the installed module as a bus location.

4. The data storage system of claim 3, wherein the communication comprises an identifier of the installed module.

5. The data storage system of claim 1, wherein:
    each module installation location defines a purported physical location at which a sensing component of a particular module will be located when the particular module is properly installed at the respective module installation location; and
    the processor is configured to direct the robotic mechanism to locate each of the set of installed modules, thereby detecting the physical presence of each installed module at the respective physical location in the data storage library by:
    directing the robotic mechanism to move serially to each of the plurality of purported physical locations until the installed module is detected to be physically present at a particular purported physical location; and
    reporting the particular purported physical location as the physical location of the installed module.

6. The data storage system of claim 5, wherein directing the robotic mechanism to move serially to each of the plurality of purported physical locations until the installed module is detected to be physically present at the particular purported physical location comprises, at each of the plurality of purported physical locations:
    determining, after moving the robotic mechanism to the purported physical location, whether a sensing component corresponding to the installed module is triggered;
    detecting that the installed module is physically present at the purported physical location when the sensing component corresponding to the installed module is triggered.

7. The data storage system of claim 1, wherein:
the structural framework defines a range of motion over which the robotic mechanism is permitted to move in a dimension, the range of motion at least encompassing the plurality of module installation locations; and
the processor is configured to direct the robotic mechanism to locate each of the set of installed modules, thereby detecting the physical presence of each installed module at the respective physical location in the data storage library by:
directing the robotic mechanism to sweep across at least a portion of the range of motion while monitoring for detection of a sensing component corresponding to the installed module;
determining a robotic mechanism location where the sensing component corresponding to the installed module is detected; and
determining the physical location of the installed module according to the robotic mechanism location where the sensing component corresponding to the installed module is detected.

8. The data storage system of claim 1, wherein the processor is configured to direct the robotic mechanism to locate each of the set of installed modules, thereby detecting the physical presence of each installed module at the respective physical location in the data storage library by:
directing the robotic mechanism to move to the physical location thereby interfacing a first sensing component of the installed module with a second sensing component of the robotic mechanism.

9. The data storage system of claim 8, wherein:
the first sensing component of the installed module is an optical sensor; and
the second sensing component of the robotic mechanism is a geometric feature of the robotic mechanism operable to interface with the optical sensor in such a way as to trigger detection of the physical presence of the installed module at the physical location.

10. The data storage system of claim 8, wherein:
the second sensing component of the robotic mechanism is an optical sensor; and
the first sensing component of the installed module is a geometric feature of the installed module operable to interface with the optical sensor in such a way as to trigger detection of the physical presence of the installed module at the physical location.

11. The data storage system of claim 1, further comprising:
a base module installed in a first module installation location, communicatively coupled with the data network, and comprising the processor.

12. A method for automated discovery of modules in a data storage library, each module including a module identifier and disposed in the data storage library for receipt by a corresponding one of a plurality of module installation locations, the method comprising:
detecting, at a first module, a logical presence of a second module at a logical location in a data network by associating the logical location with the respective module identifier of the second module;
detecting a physical presence of the second module at a physical location in the data storage library by directing a robotic mechanism to physically visit a plurality of physical locations in the data storage library such that in response to the detecting the physical presence of the second module, the robotic assembly associates the physical location with the module module, the physical location corresponding to a respective module installation location of the second module, wherein the respective module installation location in the data storage library is associciaitable with any of a plurality of logical locations in the data network;
communicating the physical location of the second module to the first module; and
generating a mapping between the logical location of the second module and the physical location of the second module based on the respective module identifier associated with the logical location and physical location of the second module.

13. The method of claim 12, wherein:
the data network comprises a plurality of physical interface locations; and
the data network is a non-deterministic network, such that each physical interface location is dynamically assigned a logical location when the data network is powered up.

14. The method of claim 12, wherein:
the first module and the second module are communicatively coupled via a universal serial bus (USB); and
detecting the logical presence of the second module at the logical location comprises receiving a communication at the first module from the second module over the USB indicating the logical location of the second module at a bus location of the USB.

15. The method of claim 12, wherein:
the data storage library includes a plurality of module installation locations, each defining a purported physical location at which a sensing component will be located when a module is properly installed at the respective module installation location; and
detecting the physical presence of the second module at the physical location in the data storage library comprises:
moving the robotic mechanism serially to each of the plurality of purported physical locations until the second module is detected to be physically present at a particular purported physical location; and
reporting the particular purported physical location as the physical location of the second module.

16. The method of claim 12, wherein:
the data storage library defines a range of motion over which the robotic mechanism is permitted to move that at least encompasses a plurality of module installation locations; and
detecting the physical presence of the second module at the physical location in the data storage library comprises:
sweeping the robotic mechanism across at least a portion of the range of motion while monitoring for detection of a sensing component corresponding to the second module;
determining a robotic mechanism location where the sensing component corresponding to the second module is detected; and
determining the physical location of the second module according to the robotic mechanism location where the sensing component corresponding to the second module is detected.

17. The method of claim 12, wherein detecting the physical presence of the second module at the physical location comprises:
moving the robotic mechanism to the physical location thereby interfacing a first sensing component of the second module with a second sensing component of the robotic mechanism.

18. The method of claim 17, wherein:
one of the first sensing component or the second sensing component is an optical sensor; and the other of the first sensing component or the second sensing component is a geometric feature operable to interface with the optical sensor in such a way as to trigger detection of the physical presence of the second module at the physical location.

19. The method of claim 12, wherein:

the first module is a base structural module comprising a base processor;

the detecting of the logical presence of the second module at the logical location is performed by the base processor;

the communicating of the physical location of the second module is to the base processor; and the generating and storing of the mapping is by the base processor.

20. A controller communicatively coupled with a data network and a robotic mechanism of a data storage system, the data storage system including a plurality of modules, each of the plurality of modules including a module identifier and disposed in the data storage library for receipt by one of a corresponding plurality of module installation locations, the controller having a processor and a tangible, non-transient storage medium, the storage medium having instructions stored thereon, which, when executed, cause the processor to perform steps comprising:

detecting a logical presence of a module installed in the data storage system at a logical location in the data network by associating the logical location with the respective module identifier of the module;

directing the robotic mechanism to physically visit a plurality of locations, thereby detecting a physical presence of the module at a physical location in the data storage system such that in response to the detecting the module, the robotic mechanism associates the physical location with the respective module identifier of the module independent of the detected logical presence of the module, the physical location corresponding to a respective module installation location of the module, wherein the respective module installation location in the data storage system is associaitable with any of a plurality of logical locations in the data network; and generating a mapping between the logical location and the physical location of the module based on the respective module identifier associated with the logical location and the physical location of the module.

* * * * *

UNITED STATES PATENT AND TRADEMARK OFFICE
CERTIFICATE OF CORRECTION

PATENT NO. : 9,183,875 B2  Page 1 of 1
APPLICATION NO. : 13/528489
DATED : November 10, 2015
INVENTOR(S) : Ries et al.

It is certified that error appears in the above-identified patent and that said Letters Patent is hereby corrected as shown below:

In the Specification

In column 4, line 48, delete "and or" and insert -- and/or --, therefor.

In column 5, line 41, delete "and or" and insert -- and/or --, therefor.

In the Claims

In column 17, line 64, in claim 1, delete "associating respective" and insert -- associating the respective --, therefor.

In column 18, lines 15-16, in claim 1, delete "associaitable" and insert -- associatable --, therefor.

In column 19, line 66, in claim 12, delete "module module," and insert -- module identifier of the second module independent of the detected logical presence of the second module, --, therefor.

In column 20, line 3, in claim 12, delete "associaitable" and insert -- associatable --, therefor.

In column 22, line 17, in claim 20, delete "associaitable" and insert -- associatable --, therefor.

Signed and Sealed this
Twenty-eighth Day of June, 2016

Michelle K. Lee
*Director of the United States Patent and Trademark Office*